United States Patent
Lee et al.

(10) Patent No.: US 8,670,361 B2
(45) Date of Patent: Mar. 11, 2014

(54) APPARATUS AND METHOD FOR CONTROL IN WIRELESS COMMUNICATION SYSTEM

(75) Inventors: Seung-Hyun Lee, Seoul (KR); Kuk-Jin Song, Yongin-si (KR)

(73) Assignee: Intellectual Discovery Co., Ltd., Seoul (KR)

( * ) Notice: Subject to any disclaimer, the term of this patent is extended or adjusted under 35 U.S.C. 154(b) by 89 days.

(21) Appl. No.: 13/142,253

(22) PCT Filed: Dec. 24, 2009

(86) PCT No.: PCT/KR2009/007778
§ 371 (c)(1),
(2), (4) Date: Jun. 24, 2011

(87) PCT Pub. No.: WO2010/074531
PCT Pub. Date: Jul. 1, 2010

(65) Prior Publication Data
US 2011/0317639 A1    Dec. 29, 2011

(30) Foreign Application Priority Data
Dec. 26, 2008    (KR) .................. 10 2008 0135030

(51) Int. Cl.
*G08C 17/00*    (2006.01)
(52) U.S. Cl.
USPC ................. 370/311; 370/252; 370/329
(58) Field of Classification Search
USPC ........................... 370/252, 311, 329
See application file for complete search history.

(56) References Cited

U.S. PATENT DOCUMENTS

| | | | |
|---|---|---|---|
| 8,176,379 B2 * | 5/2012 | Cho et al. | 714/751 |
| 2007/0140261 A1 * | 6/2007 | Wang et al. | 370/395.42 |
| 2007/0155337 A1 * | 7/2007 | Park et al. | 455/69 |
| 2008/0187071 A1 * | 8/2008 | Lee et al. | 375/296 |
| 2009/0262670 A1 * | 10/2009 | Cho et al. | 370/280 |
| 2010/0208685 A1 * | 8/2010 | Kim et al. | 370/329 |

FOREIGN PATENT DOCUMENTS

| | | |
|---|---|---|
| KR | 1020020079453 A | 10/2002 |
| KR | 1020040081060 A | 9/2004 |
| KR | 1020050101218 A | 10/2005 |
| KR | 1020080030904 A | 4/2008 |

OTHER PUBLICATIONS

International Search Report for PCT/KR2009/007778 filed on Dec. 24, 2009.
Written Opinion for PCT/KR2009/007778 filed on Dec. 24, 2009.

* cited by examiner

*Primary Examiner* — Jason Mattis
(74) *Attorney, Agent, or Firm* — Sughrue Mion, PLLC

(57) ABSTRACT

The present invention relates to a method and system for controlling an uplink (UL) in a wireless communication system, wherein packet scheduling is performed on the data packet of a mobile station to allocate multiple bursts, the parameters of the mobile station and the multiple bursts are verified, and the parameters are used to determine the MCS (Modulation and Coding Scheme) level and transmission power level for the multiple bursts.

13 Claims, 8 Drawing Sheets

APPARATUS AND METHOD FOR CONTROL IN WIRELESS COMMUNICATION SYSTEM

TECHNICAL FIELD

The present invention relates generally to wireless communication system, and more particularly to a method and system for controlling an uplink (hereinafter, referred to as 'UL') in wireless communication system.

BACKGROUND ART

Research on the next-generation communication system is being conducted to provide users with various QoS (Quality of Service) services at a high data rate. Particularly, study of the next-generation communication system is made to increase data transmission capacity and to improve QoS within restricted resources. Also, an IEEE (Institute of Electrical and Electronics Engineers) 802.16 communication system that employs OFDM (Orthogonal Frequency Division Multiplexing)/OFDMA (Orthogonal Frequency Division Multiple Access) is proposed as a BWA (Broadband Wireless Access) system, in order to support broadband transmission network for physical channels of the wireless communication system. The IEEE 802.16 communication system is a system that considers not only fixed state but also mobile state of subscriber station, wherein the subscriber station having mobility can be referred to as mobile station (hereinafter, referred to as 'MS').

Meanwhile, in the wireless communication system, a scheduling for the MS is performed in accordance with channel environment of the MS within cell and data packet corresponding to the MS. That is, the scheduler of the base station (hereinafter, referred to as 'BS') managing the MS allocates resources in downlink (hereinafter, referred to as 'DL') and UL in accordance with the channel state and data packet of the MS, determines MCS (Modulation and Coding Scheme) level for the allocated resources, and determines transmission power level of the MS to have appropriate reception power level in UL. In particular, the scheduler allocates resources of UL to the MS in accordance with information about the MS, and determines the MCS level and transmission power level for the MS. Herein, the information about the MS includes data packet information and transmission power information of the MS, etc.

Therefore, there is a demand for new scheme that can efficiently control the scheduling to safely transmit large-capacity data at high speed through restricted frequency resources in variable communication environment. In addition, there is a demand for new scheme that can efficiently control the MCS level and transmission power level to increase data transmission rate through allocated resource in accordance with UL data of the MS. Also, there is a demand for new scheme that can efficiently control the scheduling for the burst and control the MCS level and transmission power level for the corresponding burst, in case of HARQ (Hybrid Automatic Repeat request) based transmission.

DISCLOSURE

Technical Problem

Therefore, the present invention has been made in view of the above-mentioned demands, and it is an object of the present invention to provide an apparatus and method for controlling the UL scheduling to increase transmission rate of UL data packet in accordance with information of MS in wireless communication system.

It is another object of the present invention to provide an apparatus and method for controlling the UL scheduling, MCS level, and transmission power level of the MS by using UL data packet information, transmission power information, and parameters of the MS in wireless communication system.

It is further another object of the present invention to provide an apparatus and method for controlling the UL scheduling, MCS level, and transmission power level for the multi-bursts allocated to the MS in HARQ based data transmission in wireless communication system.

Technical Solution

According to one aspect of the present invention, there is provided an apparatus for control in wireless communication system, the apparatus comprising: a packet scheduler for allocating multi-bursts comprising a HARQ burst and normal burst to a mobile station; an operation part for determining a MCS level and transmission power level for the multi-bursts by using burst information and parameter of the multi-bursts allocated to the mobile station; and a generation part for generating MAP information comprising the burst information and MCS level and transmission power level information.

According to another aspect of the present invention, there is provided a method for control in wireless communication system, the method comprising: allocating multi-bursts comprising a HARQ burst and normal burst by performing packet scheduling for data packet of a mobile station; checking the multi-bursts and parameter of the mobile station; and determining an MCS level and transmission power level for the multi-bursts by using parameter.

Advantageous Effects

The present invention can increase the transmission rate of UL data and increase the usage efficiency of the restricted resources by controlling the UL scheduling of the MS by using UL data packet information, transmission power information, and parameter of MS in transmission/reception of data packet of MS.

In particular, the present invention can increase the transmission rate of data through the restricted resources by dynamically controlling the UL resource allocation, MCS level, and transmission power level for the bursts for HARQ based data packet transmission/reception by using UL data packet information, transmission power information, and parameters of the MS.

Also, the present invention can easily perform the scheduling control for multi-bursts which are allocated to the MS in same time interval.

DESCRIPTION OF THE DRAWINGS

The above and other aspects, features and advantages of the present invention will become more apparent from the following detailed description when taken in conjunction with the accompanying drawings in which.

MODE FOR INVENTION

Figure 1:
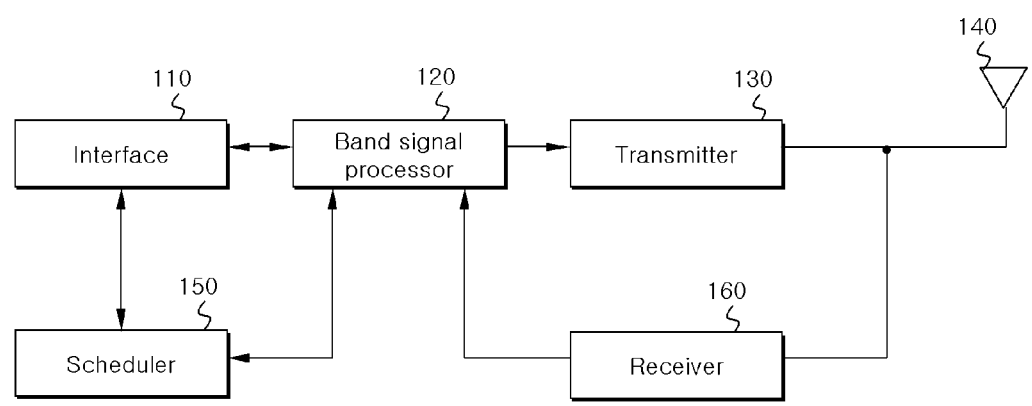
FIG. 1 is a diagram illustrating a structure of a BS in wireless communication system according to an embodiment of the present invention.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

The present proposes a control apparatus and method in wireless communication system, e.g. the IEEE 802.16 communication system that is a kind of the BWA system. For reference, in following embodiments, the present invention will be described based on the IEEE 802.16 communication system that employs OFDM/OFDMA scheme.

Also, the present invention proposes an apparatus and method for controlling the scheduling of the MS when the BS and MS perform HARQ based data transmission in wireless communication system. For reference, in following embodiments, the BS according to the present invention allocates the multi-bursts to the MS by performing the packet scheduling of the MS according to whether HARQ scheme is applied or not. Herein, the connection for data transmission between the BS and MS can be classified into a HARQ supportable connection and a HARQ non-supportable connection according to whether HARQ scheme is applied or not, then the BS and MS transmit/receive data through HARQ supportable connection or HARQ non-supportable connection according to whether HARQ scheme is applied or not.

Herein, the multi-bursts include a burst (hereinafter, referred to as 'normal burst') that transmits data packet through the HARQ non-supportable connection and a burst (hereinafter, referred to as 'HARQ burst') that transmits data packet through the HARQ supportable connection. Also, the HARQ burst can be classified into a HARQ sub-burst (hereinafter, referred to as 'first HARQ sub-burst') that is first transmitted through the HARQ supportable connection and a HARQ sub-burst (hereinafter, referred to as 'second HARQ sub-burst') that is retransmitted through the HARQ supportable connection in case that the transmission of the HARQ burst has failed.

Meanwhile, the BS according to the present determines the MCS level and transmission power level for the multi-bursts allocated to the MS by using the parameters of the MS. Herein, the parameters of the MS are the total transmission power, current transmission power, and available transmission power of the MS, CINR (Carrier to Interference and Noise Ratio) and path loss in DL, CINR in UL, NI (Noise and Interference) occurred between adjacent cells in multi-cells environment, etc. For example, the BS according to the present receives CQI (Channel Quality Information) from the MS, acquires the CINR in DL through the CQI, measures the CINR and NI in UL, and checks the CINR and NI in UL by the measurement. Herein, the CINR in DL indicates a CINR that the MS measures in reception of DL data packet from the BS, which is transmitted from the MS to the BS through the CQI. The path loss in DL indicates a path loss that occurs for DL data packet when the MS receives the DL data packet from the BS. Also, the total transmission power, current transmission power, and available transmission power of the MS are transmission powers when the MS transmits the UL data packet, which can be checked by report message containing current transmission power of the MS. The CINR in UL indicates a CINR that the BS measures in reception of UL data packet from the MS, and the NI is measured by the BS from noise and interference affected by adjacent cells in reception of the UL data packet from the MS in multi-cells environment.

In following embodiments, the BS according to the present invention performs the packet scheduling for the data packet of the MS, checks the multi-bursts (i.e. normal burst, first HARQ sub-burst, and second HARQ sub-burst) for the data packet according to the packet scheduling, and determines the MCS level and transmission power level for the multi-bursts by using the CINR and path loss in DL, CINR and NI in UL, etc. Thereafter, the BS generates MAP information containing information about the multi-bursts and information about the MCS level and transmission power level, and transmits the MAP information to the MS.

Hereinafter, with reference to FIG. 1, the structure of the BS in wireless communication system according to an embodiment of the present invention will now be described.

FIG. 1 is a diagram illustrating the structure of the BS in wireless communication system according to an embodiment of the present invention.

Referring to FIG. 1, the BS includes an interface 110 which processes data in transmission/reception of data, a band signal processor 120 which performs modulation/demodulation and encoding/decoding for data, a transmitter 130 which transmits the modulated and encoded data, a receiver 160 which receives data from the MS, a scheduler 150 which performs the scheduling for data transmission/reception in DL and UL, and an antenna 140 which transmits and receives data with the MS through the air.

In UL path, the receiver 160 receives one or more radio signals that terminals transmit, via the antenna 140, and converts the received radio signals into baseband signals. For example, the receiver 160 removes noises from the received signals, amplifies the noise-removed signals, down-converts the amplified signals into baseband signals, and digitalizes the down-converted baseband signals. The band signal processor 120 extracts information or data bits from the digitalized signals, and performs demodulation, decoding, error correction processes thereon. The information or data bits which go through these processes are sent to adjacent wired/wireless networks via the interface 110 or transmitted again to other MSs being served by the BS through transmission path.

In DL path, the interface 110 receives voice, data and/or control information from a base station controller or radio network, and the band signal processor 120 encodes the voice, data and/or control information and outputs the results to the transmitter 130. The transmitter 130 modulates the encoded voice, data and/or control information with carrier signals having a desired transmission frequency or frequencies, amplifies the modulated carrier signals to a level suitable for transmission, and transmits the amplified carrier signals over the air via the antenna 140.

Meanwhile, the scheduler 150 controls each process and element in DL and UL. The scheduler 150 performs the UL scheduling according to an embodiment of the present invention, and controls the UL resource allocation, MCS level, and transmission power level for the MS by using MS information and channel information in DL and UL.

Hereinafter, with reference to FIG. 2, an apparatus for controlling the UL scheduling in wireless communication system according to an embodiment of the present invention will now be described.

Figure 2:
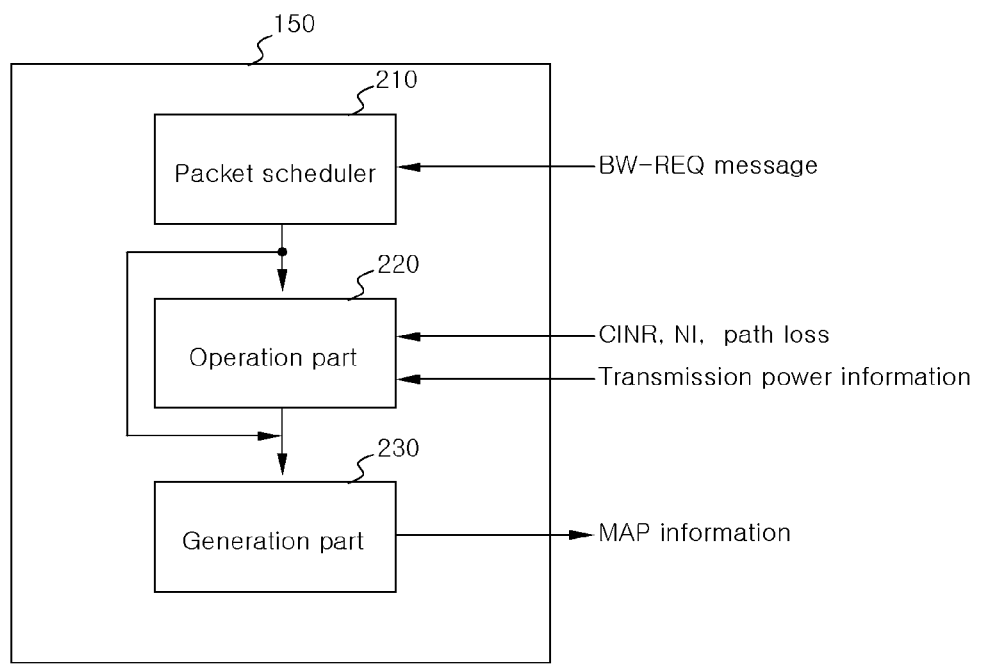
FIG. 2 is a diagram illustrating a structure of a scheduler in wireless communication system according to an embodiment of the present invention.

FIG. 2 is a diagram illustrating the structure of the scheduler 150 of FIG. 1.

Referring to FIG. 2, the scheduler 150 according to the present invention includes a packet scheduler 210 that performs the packet scheduling for the UL data packet of the MS, an operation part 220 that determines the MCS level and transmission power level for the MS, and a generation part 230 that generates the MAP information containing burst information and MCS level and transmission power level information for MS.

The packet scheduler 210 checks BW-REQ (Bandwidth Request) message, if the receiver 160 receives BW-REQ message requesting UL resource allocation for the transmission of the UL data packet from the MS. Then, the packet scheduler 210 checks the UL data packet that the MS will transmit, through the BW-REQ message, performs the packet scheduling for the UL data packet of the MS, and allocates burst to the MS by packet scheduling. Herein, the packet scheduler 210 can allocate a normal burst, first HARQ sub-burst, and second HARQ sub-burst to the MS, and whether each burst is allocated to the MS or not is determined by the priority order of the UL data packet that is transmitted by each burst. For reference, the burst allocation indicates an allocation of resource, sub-channel, and slot for transmission of the UL data packet. Then, the packet scheduler 210 sends burst information about burst to be allocated to the MS to the operation part 220, wherein the burst information includes indication information indicating the normal burst, first HARQ sub-burst, and second HARQ sub-burst, and position information indicating position of the normal burst, first HARQ sub-burst, and second HARQ sub-burst in a frame.

The operation part 220 receives the burst information of the MS from the packet scheduler 210, and checks the CINR and path loss in DL, CINR and NI in UL, and transmission power report from the receiver 160. For example, if the receiver 160 receives the CQI from the MS, the operation part 220 checks the CINR in DL (hereinafter referred to as 'DL CINR') through the CQI. If the receiver 160 receives the report message from the MS, the operation part 220 checks the path loss in DL and transmission power report of the MS through the report message. If the receiver 160 measures the CINR in UL (hereinafter referred to as 'UL CINR') and NI, the operation part 220 checks the UL CINR and NI through the measurement. For reference, the DL CINR indicates a CINR measured by the MS when the MS receives the DL data packet from the BS, which is transmitted from the MS to the BS through the CQI. The path loss indicates a path loss of the DL data packet when the MS receives the DL data packet from the BS, which is transmitted from the MS to the BS through the report message. The transmission power report indicates a report for the transmission power when the MS transmits the UL data packet, which is transmitted from the MS to the BS through the report message. The UL CINR indicates a CINR measured by the receiver 160 when the receiver 160 receives the UL data packet from the MS. The NI indicates noise and interference affected by adjacent cell on transmission of the UL data packet from the MS in multi-cells environment, which is measured by the receiver 160.

The operation part 220 checks the multi-bursts (i.e. normal burst, first HARQ sub-burst, and second HARQ sub-burst) allocated to the MS through the burst information and checks the total transmission power level, current transmission power level, and available transmission power of the MS through the transmission power report. Then, the operation part 220 determines the MCS level and transmission power level for the normal burst, first HARQ sub-burst, and second HARQ sub-burst by using the transmission power level of the MS, DL CINR, path loss, UL CINR, and NI. Herein, the operation part 220 first checks whether the second HARQ sub-burst exists or not, and determines the MCS level and transmission power level for the multi-bursts in consideration of the information about the second HARQ sub-burst if the second HARQ sub-burst exists. The determination of the MCS level and transmission power level is performed in order according to the priority order on which the packet scheduler 210 performs the packet scheduling.

Specifically, the operation part 220 checks the multi-bursts allocated to the MS, and determines the MCS level and transmission power level for the first scheduled burst having the highest priority order, based on the allowable total transmission power of the MS which is confirmed by the transmission power report. Then, the allowable total transmission power of the MS will be reduced according to the determined MCS level and transmission power level, and the operation part 220 determines thr MCS level and transmission power level for the second scheduled burst having the next highest priority order, based on the reduced total transmission power of the MS. Herein, if the second HARQ sub-burst exists, the operation part 220 determines the MCS level and transmission power level for the first scheduled burst having the highest priority order in consideration of the information about the second HARQ sub-burst. Thereby, the operation part 220 determines the MCS level and transmission power level for the multi-bursts not to exceed the allowable total transmission power of the MS, and determines a size of data packet in accordance with the determined MCS level and transmission power level. For reference, the available MCS levels for the multi-bursts allocated to the MS are QPSK (Quadrature Phase Shift Key) ½ with repetition 6, QPSK ½ with repetition 4, QPSK ½ with repetition 2, QPSK ½, QPSK ¾, 16 QAM (Quadrature Amplitude Modulation) ½, 16 QAM ¾, etc. Therefore, the operation part 220 performs a function of a power control module that controls the MCS level and transmission power level.

The generation part 230 generates the MAP information containing size information for the data packet that is transmitted by the burst, according to the burst information, MCS level, and transmission power level of the MS. In this case, Power Control IE (Information Element) corresponding to the transmission power level is transmitted to the generation part 230. Then, the generation part 230 generates MAP IE as the MAP information containing the MCS level and burst information for the multi-bursts, and transmits the MAP IE to the MS.

Hereinafter, with reference to FIG. 3, the operation part 220 that determines the MCS level and transmission power level for the multi-bursts allocated to the MS in wireless communication system according to an embodiment of the present invention will now be described.

Figure 3:
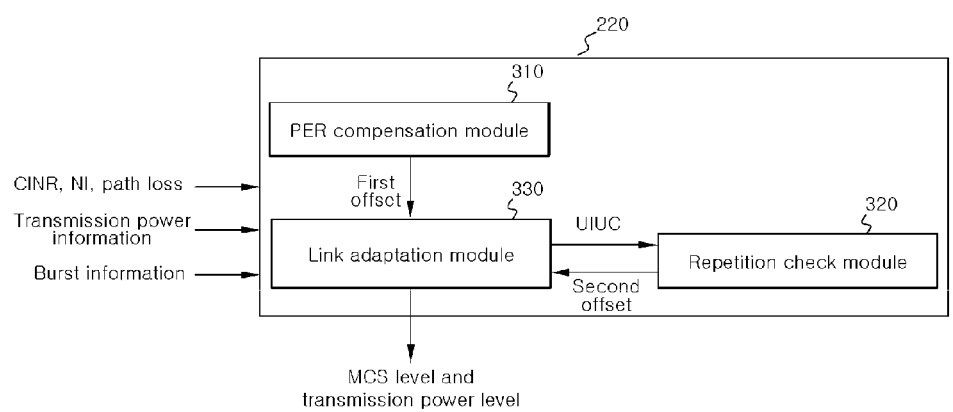
FIG. 3 is a diagram illustrating a structure of an operation part in wireless communication system according to an embodiment of the present invention.

FIG. 3 is a diagram illustrating the structure of the operation part 220 of FIG. 2.

Referring to FIG. 3, the operation part 220 according to the present invention includes a PER (Packet Error Rate) compensation module 310, a repetition check module 320, and a link adaptation module 330, and determines the MCS level and transmission power level for the multi-bursts allocated to the MS by using the burst information, DL CINR, UL CINR, path loss, NI, and transmission power information of the MS. Herein, the burst information indicates information about the multi-bursts (i.e. normal burst, first HARQ sub-burst, and second HARQ sub-burst) allocated by the packet scheduling of the packet scheduler 210, which is transmitted from the packet scheduler 210 to the link adaptation module 330. The DL CINR is checked by the CQI that the receiver 160 receives from the MS, the UL CINR and NI are checked by the measurement of the receiver 160, and the transmission power information and path loss are checked by the report message that the receiver 160 receives from the MS. The PER compensation module 310 and the repetition check module 320 are independent of the first offset or the second offset, and the link adaptation module 330 is dependent on the PER compensation module 310 and the repetition check module 320.

The PER compensation module 310 determines and outputs the first offset to compensate PER for the UL burst. Herein, the first offset indicates an offset to compensate PER that increases according to rapid variation of Instant CINR, and corresponds to a power offset to compensate PER in every frame in consideration of padding channel. For reference, if a difference between average PER in current frame and average PER in previous frame is higher than the first threshold value (Threshold$_{HighPER}$), the first offset is set to be increased by the first increment/decrement value (P$_{increment}$) from the first offset of the previous frame. If the difference between average PER in current frame and average PER in previous frame is lower than the second threshold value (Threshold$_{LowPER}$), the first offset is set to be decreased by the second increment/decrement value (P$_{decrement}$) from the first offset of the previous frame. Otherwise, the first offset is set to be the same as the first offset of the previous frame.

Also, the PER compensation module 310 includes an average PER comparison unit (not shown) and a first offset control unit (not shown). The average PER comparison unit compares the difference between average PER in current frame and average PER in previous frame with the first threshold value (Threshold$_{HighPER}$) or the second threshold value (Threshold$_{LowPER}$). The first offset control unit increases the first offset by the first increment/decrement value (P$_{increment}$) or decreases the first offset by the second increment/decrement value (P$_{decrement}$) from the first offset of the previous frame, according to the result of the average PER comparison unit.

The repetition check module 320 outputs the second offset for burst repetition in the MCS level with repetition by using UIUC (Uplink Interval User Code). That is, the repetition check module 320 determines and outputs the second offset for compensation of an operation error for the transmission power level per sub-carrier burst, when specific MCS level for the UL burst is repeatedly applied. Herein, the second offset indicates a power offset for compensation to satisfy Required CINR in case that the MCS level applied for transmission of the UL data packet includes repetition. Therefore, the repetition check module 320 does not output the second offset in case that MCS level applied for transmission of the UL data packet does not include repetition.

The link adaptation module 330 increases the data transmission rate by efficiently using a restricted maximum transmission power of the MS (i.e. total transmission power of the MS), and determines the MCS level and transmission power level for the multi-bursts allocated to the MS by using the first and second offset, CINR, path loss, NI, and transmission power information of the MS, for link adaptation using the first and second offset. Herein, the link adaptation module 330 checks the multi-bursts (i.e. normal burst, first HARQ sub-burst, and second HARQ sub-burst) allocated to the MS through the burst information received from the packet scheduler 210, and determines the maximum MCS level and highest transmission power level in consideration of the information about the second HARQ sub-burst if the second HARQ sub-burst exists. Also, the link adaptation module 330 determines the MCS level and transmission power level for the multi-bursts within the determined maximum MCS level and highest transmission power level, not to exceed the allowable total transmission power of the MS.

Hereinafter, with reference to FIG. 4, the link adaptation module 330 that determines the MCS level and transmission power level according to an embodiment of the present invention will now be described.

Figure 4:
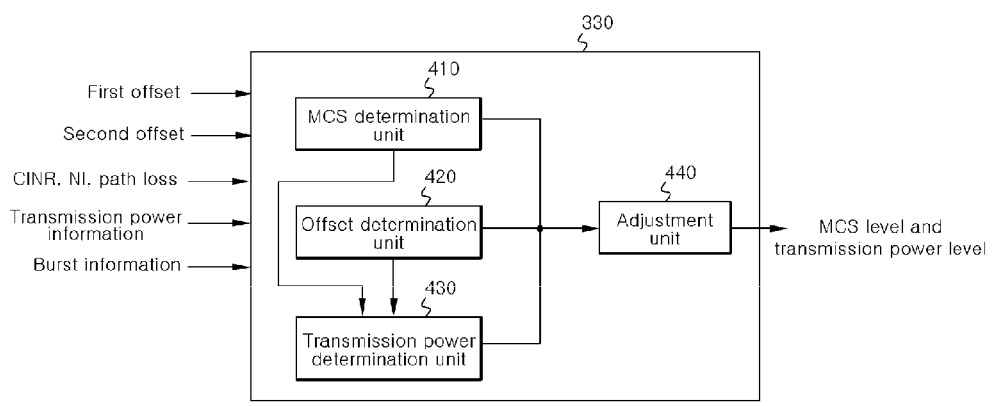
FIG. 4 is a diagram illustrating a structure of a link adaptation module in wireless communication system according to an embodiment of the present invention.

FIG. 4 is a diagram illustrating the structure of the link adaptation module 330 of FIG. 3.

Referring to FIG. 4, the link adaptation module 330 according to the present invention includes an MCS determination unit 410, an offset determination unit 420, a transmission power determination unit 430, and an adjustment unit 440, and determines the MCS level and transmission power level for the multi-bursts allocated to the MS by using the first and second offset, CINR, path loss, NI, and transmission power information of the MS. Herein, the first and second offset, CINR, path loss, NI, and transmission power information of the MS are respectively transmitted to the MCS determination unit 410, the offset determination unit 420, the transmission power determination unit 430, and the adjustment unit 440 corresponding thereto.

The MCS determination unit 410 checks the multi-bursts allocated to the MS, and determines the maximum MCS level for the multi-bursts allocated to the MS among MCS levels that include QPSK ½ with repetition 6, QPSK ½ with repetition 4, QPSK ½ with repetition 2, QPSK ½, QPSK ¾, 16 QAM ½, 16 QAM ¾, etc. Specifically, the MCS determination unit 410 checks the normal burst, first HARQ sub-burst, and second HARQ sub-burst allocated to the MS, and determines the MCS level for the normal burst, first HARQ sub-burst, and second HARQ sub-burst, by using the CINR, path loss, NI, and transmission power information of the MS. In this case, the MCS determination unit 410 determines the maximum MCS level for the multi-bursts in consideration of the information about the second HARQ sub-burst if the second HARQ sub-burst exists, and determines the maximum MCS level for the multi-bursts in consideration of the information about the first scheduled burst having the highest priority order if the second HARQ sub-burst does not exist.

As mentioned above, since the maximum MCS level is determined according to types of the multi-bursts (e.g. whether the second HARQ sub-burst exists or not), an appropriate MCS level can be selected without causing a case that the transmission power for the multi-bursts allocated to the MS exceeds the available total transmission power of the MS. Specifically, the MS can be classified into a MS that can use different transmission powers for the multi-bursts to be transmitted at the same time and a MS that can not use different transmission powers for the multi-bursts to be transmitted at the same time, according to the performance of the MS. Therefore, if the MCS level and transmission power level is determined according to the above mentioned way, in the worst case that different transmission powers can not be used for the multi-bursts to be transmitted at the same time, the usage of the transmission power for the multi-bursts is controlled efficiently and the scheduling is performed to meet a condition that the MS demands regardless of the performance of the MS.

Herein, if the second HARQ sub-burst does not exist, the MCS determination unit 410 determines the maximum MCS level according to the DL CINR based scheme (hereinafter referred to as 'the first determination scheme') or DIUC (Downlink Interval User Code) based scheme (hereinafter referred to as 'the second determination scheme'). Then, the MCS determination unit 410 sends the maximum MCS level for the multi-bursts to the adjustment unit 440. For reference, the maximum MCS level determination process of the MCS determination unit 410 will be described below with reference to FIG. 6.

The offset determination unit 420 determines the control offset for the multi-bursts allocated to the MS within the restricted highest transmission power of the MS. Herein, the offset determination unit 420 determines the control offset for a case that the transmission power determination unit 430 determines the highest transmission power level for the multi-bursts by using the CINR, path loss, NI, and transmission power information of the MS. The control offset indicates an offset for the power control between the transmission power level (hereinafter referred to as 'the first transmission power level') corresponding to the candidate MCS level which can be determined to the maximum MCS level by the MCS determination unit 410 and the highest transmission power level determined by the transmission power determination unit 430. For reference, the control offset determination process of the offset determination unit 420 will be described below with reference to FIG. 7.

The transmission power determination unit 430 checks multi-bursts allocated to the MS, and determines the highest transmission power level for the multi-bursts allocated to the MS by using the CINR, path loss, NI, and transmission power information of the MS. Specifically, the transmission power determination unit 430 checks the normal burst, first HARQ sub-burst, and second HARQ sub-burst allocated to the MS, and determines the highest transmission power level for the multi-bursts according to the scheduling priority order by using the CINR, path loss, NI, and transmission power information of the MS, wherein the highest transmission power level is determined in accordance with the maximum MCS level determined by the MCS determination unit 410. Also, if the total transmission power of the MS is updated, the transmission power determination unit 430 determines the highest transmission power level for a specific burst and other bursts based on the updated total transmission power of the MS. For reference, when the adjustment unit 440 determines the MCS level and transmission power level for the specific burst among multi-bursts based on the allowable total transmission power of the MS, the update of the total transmission power of the MS is performed in accordance with the determination of the adjustment unit 440. For example, if the adjustment unit 440 determines 13 dBm of the transmission power for the specific burst within 23 dBm of the maximum total transmission power of the MS, the updated total transmission power of the MS is 10 dBm. Then, the adjustment unit 440 determines the highest transmission power level for other bursts within 10 dBm of the updated total transmission power of the MS.

The transmission power determination unit 430 determines the first transmission power level according to the maximum MCS level within the restricted highest transmission power of the MS, by using the CINR, path loss, NI, and by further using the transmission power level (hereinafter referred to as 'the second transmission power level') for the multi-bursts which is determined latest by the link adaptation module 330 or the transmission power level (hereinafter referred to as 'the third transmission power level') for the multi-bursts which is determined in accordance with the transmission power information of the MS reported latest from the MS. Also, the transmission power determination unit 430 determines the highest transmission power level for the multi-bursts by summing up the first transmission power level and the control offset determined by the offset determination unit 420 and transmits the highest transmission power level for the multi-bursts to the adjustment unit 440.

According to an embodiment of the present invention, the first transmission power level can be obtained by using the following Equation 1, the second transmission power level can be obtained by using the following Equation 2, and the third transmission power level can be obtained by using the following Equation 3.

$$P_{Tx\_p} = P_{Tx\_n} + (C/N_{MCS} - C/N_{QPSK1/2}) + 10 \log 10(R_{MCS}) \quad \text{[Equation 1]}$$

$$P'_{Tx\_n} = P_{Tx\_h} + (C/N_{QPSK1/2} - C/N_h) + 10 \log 10(R_h) \quad \text{[Equation 2]}$$

$$P''_{Tx\_n} = P_{Tx\_r} + (C/N_{QPSK1/2} - C/N_r) + 10 \log 10(R_r) \quad \text{[Equation 3]}$$

The first transmission power level added to the control offset becomes the highest transmission power level, and the highest transmission power level becomes the normalized transmission power level of the second transmission power level by Equation 2. That is, the latest determined highest transmission power level becomes the second transmission power level, and the second transmission power level is normalized and stored by Equation 2. Similarly, the third transmission power level is normalized and stored by Equation 3. The transmission power determination unit 430 determines the first transmission power level by using the latest stored normalized transmission power level between the normalized transmission power level of the second transmission power level and the normalized transmission power level of the third transmission power level.

Where, the normalized transmission power level indicates a transmission power level that has been normalized based on the predetermined reference MCS level (i.e. QPSK ½). The second transmission power level and third transmission power level are normalized and stored in a storage unit (not shown). Thus, by using the normalized transmission power level, the transmission power determination unit 430 can easily calculate the first transmission power level. That is, the transmission power determination unit 430 can calculate the first transmission power level by easily expanding the normalized transmission power level with the reference MCS level to the transmission power level corresponding to the candidate MCS level for the multi-bursts.

For reference, in Equation 1, $P_{TX\_p}$ denotes a predicted transmission power level for the candidate MCS level that can be applied to the burst of the MS, as the first transmission power level. $P_{TX\_n}$ denotes a latest stored normalized transmission power level between the normalized transmission power level of the second transmission power level and the normalized transmission power level of the third transmission power level. $C/N_{MCS}$ denotes a normalized C/N (Carrier/Noise) in accordance with the candidate MCS level, as a Required CINR for the candidate MCS level. $C/N_{QPSK1/2}$ denotes a normalized C/N in accordance with the reference MCS level (e.g. QPSK ½), as a Required CINR for QPSK ½. $R_{MCS}$ denotes a repetition count of the candidate MCS level.

In Equation 2, $P'_{TX\_n}$ denotes a normalized transmission power level from the latest determined transmission power level for the multi-bursts based on the reference MCS level, as the normalized transmission power level of the second transmission power level. $P_{TK\_h}$ denotes a highest transmission power level among the scheduled bursts which is determined by adding the control offset to the first transmission power level. $C/N_h$ denotes a Required CINR of the MCS level for the highest transmission power level. $R_h$ denotes a repetition count of the MCS level for the highest transmission power level.

In Equation 3, $P''_{TX\_n}$ denotes a normalized transmission power level from the transmission power level which is determined in accordance with the transmission power information reported latest from the MS, as the normalized transmission power level of the third transmission power level. $P_{TX\_r}$ denotes a reported transmission power level of the MS. $C/N_r$ denotes a reported Required CINR of the MCS level for the transmission power level. $R_r$ denotes a scheduled repetition count of the MCS level. Where, $P_{TX\_r}$ is included in the validate BW-REQ and UL transmission power report header that the MS transmits to the BS to report the UL transmission power information, $C/N_r$ is determined by the MCS level of the header, and $R_r$ is determined by the repetition count of the header.

If the MCS determination unit 410 and the transmission power determination unit 430 determine the maximum MCS level and highest transmission power level for the multi-bursts allocated to the MS according to the priority order of the packet scheduling, the adjustment unit 440 determines a final MCS level and transmission power level by adjusting the maximum MCS level and highest transmission power level for the multi-bursts (i.e. normal burst, first HARQ sub-burst, and second HARQ sub-burst). In this case, the adjustment unit 440 finally determines the maximum MCS level determined by the MCS determination unit 410 as the MCS level for the multi-bursts, and finally determines the highest transmission power level determined by the transmission power determination unit 430 as the transmission power level for the multi-bursts.

Also, the adjustment unit 440 updates the total transmission power of the MS after determining the MCS level and transmission power level for the multi-bursts according to the priority order of the packet scheduling, and determines the MCS level and transmission power level for the burst having the next priority order based on the updated total transmission power. For reference, the MCS level and transmission power level determination process of the adjustment unit 440 will be described below with reference to FIG. 8.

Hereinafter, with reference to FIG. 5, a process in which the scheduler controls the UL scheduling in wireless communication system according to an embodiment of the present invention will now be described.

Figure 5:
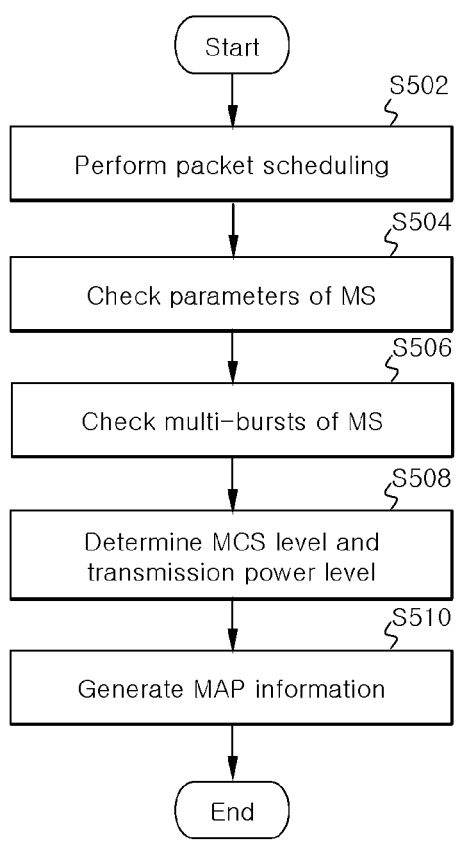
FIG. 5 is a flowchart illustrating a process in which a scheduler controls the UL scheduling in wireless communication system according to an embodiment of the present invention.

FIG. 5 is a flowchart illustrating the process in which the scheduler of FIG. 2 controls the UL scheduling.

Referring to FIG. 5, in Step S502, the scheduler checks the BW-REQ message that the MS transmits, checks the packet data of the MS through the BW-REQ message, performs the packet scheduling for the checked packet data, and allocates the multi-bursts to the MS. Where, the multi-bursts can include the normal burst, first HARQ sub-burst, and second HARQ sub-burst, etc. Then, in Step S504, the scheduler checks parameters of the MS through the receiver. That is, the scheduler checks the transmission power level, DL CINR, path loss, UL DINR, NI, etc. Herein, the DL CINR can be obtained through the CQI that the receiver has received from the MS, the transmission power level can be obtained through the transmission power information (e.g. report message) that the receiver has received from the MS, and the path loss can be obtained through the report message that the receiver has received from the MS. Also, the UL CINR and NI can be obtained through a measurement when the receiver receives the UL data packet from the MS.

In Step S506, the scheduler checks the multi-bursts (e.g. normal burst, first HARQ sub-burst, and second HARQ sub-burst) allocated to the MS by packet scheduling. Then, in Step S508, the scheduler determines the MCS level and transmission power level for the multi-bursts by using the parameters of the MS, Herein, the MCS level and transmission power level are determined according to the priority order of the packet scheduling. For reference, the MCS level is determined from the maximum MCS level that is determined by using the CINR, path loss, and NI. And, the transmission power level is determined from the highest transmission power that is determined by adding the first transmission power level to the control offset, wherein the control offset is determined by using the CINR, path loss, NI, and the second transmission power level or the third transmission power level.

Hereinafter, with reference to FIG. 6, the process of the maximum MCS determination in wireless communication system according to an embodiment of the present invention will now be described.

Figure 6:
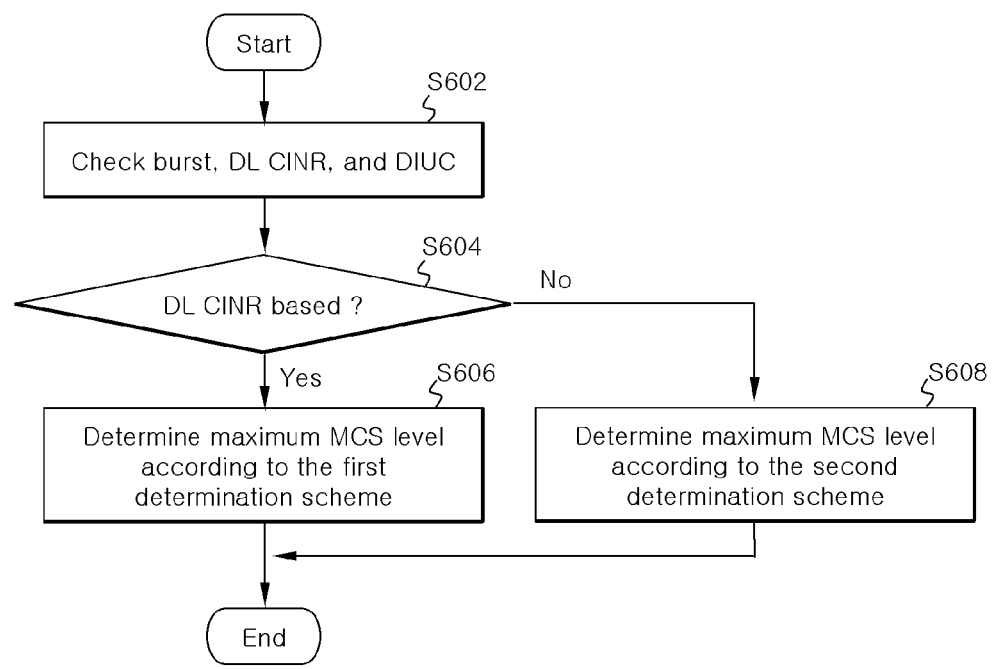
FIG. 6 is a flowchart illustrating a process in which a MCS determination unit determines the maximum MCS level in wireless communication system according to an embodiment of the present invention.

FIG. 6 is a flowchart illustrating the process in which the MCS determination unit of FIG. 4 determines the maximum MCS level.

Referring to FIG. 6, in Step S602, the MCS determination unit checks the multi-bursts allocated to the MS, checks through DL flag whether to use the DL CQI for UL or not, and checks the DL CINR and latest scheduled DIUC for the multi-bursts through the CQI. Then, in Step S604, the MCS determination unit checks whether the determination of the maximum MCS level for the multi-bursts allocated to the MS bases on the DL CINR or not. Herein, the determination of the maximum MCS level indicates the determination of the maximum MCS level for the normal burst, first HARQ sub-burst, and second HARQ sub-burst allocated to the MS.

As a result of the check in Step S604, if the determination of the maximum MCS level bases on the DL CINR, in Step S606, the MCS determination unit determines the maximum MCS level for the multi-bursts according to the first determination scheme. The first determination scheme is a scheme that determines the MCS level having the Required CINR corresponding to the DL CINR measured by the MS as the maximum MCS level, on the assumption that the path loss of DL is the same as the path loss of UL. Herein, the path loss of UL is determined by the receiver when the receiver receives the UL data packet from the MS. The first determination scheme can prevent dissipation of unnecessary transmission power since the first determination scheme determines the maximum MCS level in consideration of interference between cells or sectors in multi-cells or multi-sectors environment by using the DL CINR based determination scheme. Specifically, if the UL traffic does not satisfy the Required CINR of the MCS level owing to the interference, the MCS level and transmission power level of the MS should be increased. Then, these increases occur simultaneously in MSs that interfere with each other. Thereby, the interference is further increased, the reception of the UL traffic becomes difficult, and the dissipation of unnecessary transmission power occurs. However, according to the present invention, since the maximum MCS level for the UL bursts is determined based on the DL CINR, these increases do not occur and the dissipation of unnecessary transmission power is prevented.

Meanwhile, as a result of the check in Step S604, if the determination of the maximum MCS level does not base on the DL CINR, in Step S608, the MCS determination unit determines the maximum MCS level for the multi-bursts according to the second determination scheme. The second determination scheme is a scheme that determines the MCS level having the DIUC as the maximum MCS level. In this case, the MCS determination unit substitutes the DIUC with the UIUC and determines the maximum MCS level by using the UIUC.

Hereinafter, with reference to FIG. 7, the process of the control offset determination in wireless communication system according to an embodiment of the present invention will now be described.

Figure 7:
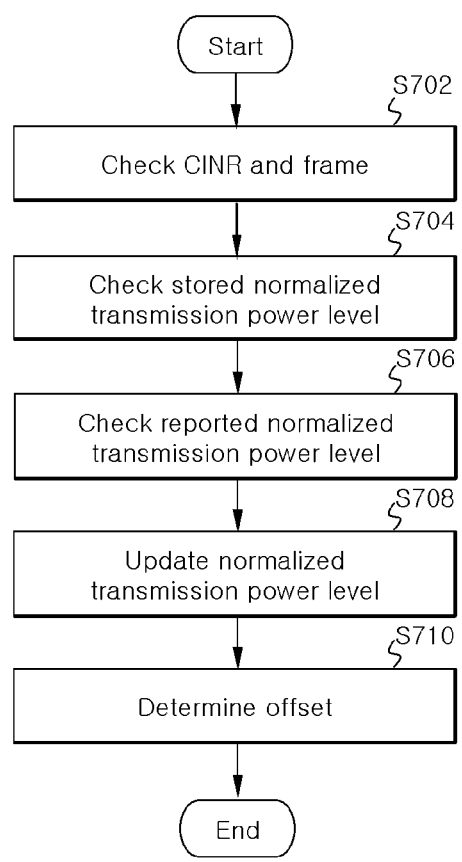
FIG. 7 is a flowchart illustrating a process in which an offset determination unit determines a control offset in wireless communication system according to an embodiment of the present invention.

FIG. 7 is a flowchart illustrating the process in which the offset determination unit of FIG. 4 determines the control offset.

Referring to FIG. 7, in Step S702, the offset determination unit checks the UL CINR that the BS measures in UL for the bursts of the UL data packet received from the MS, checks the frame number corresponding to the UL CINR, and checks the current frame number and the frame number corresponding to non-zero control offset. In this case, the offset determination unit checks the transmission power level through the latest CINR, the number of CINRs which are determined for the bursts of the UL data packet in every frame, the MCS level list that is predetermined between the BS and the MS, and transmission power list. Then, in Step S704, the offset determination unit checks the latest stored normalized transmission power level. For reference, the checked normalized transmission power level is the normalized transmission power level of the second transmission power level by Equation 2.

In Step S706, the offset determination unit checks the transmission power information reported from the MS, and checks the latest reported transmission power level through the transmission power information. Herein, the checked transmission power level is normalized into the normalized transmission power level of the third transmission power level, by Equation 3. In this case, the offset determination unit checks the latest reported transmission power level after substituting the latest CINR with Required CINR by using the MCS level list, if a different between the current frame number and the frame number corresponding to non-zero control offset is lower than the first set value, regardless of the reception period of the transmission power information.

Then, in Step S708, the offset determination unit updates the normalized transmission power level for control offset determination with the latest normalized transmission power level from between the latest stored normalized transmission power level and the latest reported normalized transmission power level. For example, if the number of the measured CINRs is higher than the second set value, the offset determination unit updates with the latest stored normalized transmission power level. Otherwise, the offset determination unit updates with the latest reported normalized transmission power level. Then, in Step S710, the offset determination unit determines the control offset by using a difference between the Required CINR corresponding to the updated normalized transmission power level and the latest CINR. Herein, the Required CINR is determined by the MCS level list.

If the control offset is determined in this way, in Step S508, the scheduler determines the highest transmission power level by adding up the control offset and the first transmission power level, and determines the highest transmission power level as the transmission power level for the multi-bursts allocated to the MS.

Then, in Step S510, the scheduler generates the MAP information containing the burst information, the MCS level information, and the transmission power level information for the multi-bursts of the MS.

Hereinafter, with reference to FIG. 8, the process of the MCS level and transmission power level determination in wireless communication system according to an embodiment of the present invention will now be described.

Figure 8:
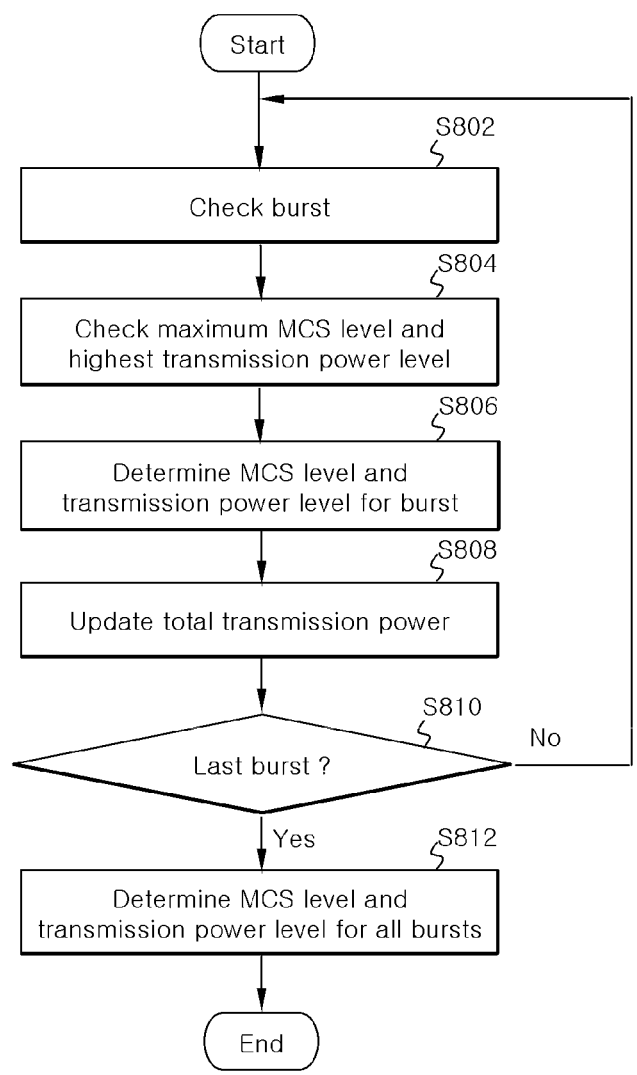
FIG. 8 is a flowchart illustrating a process in which an adjustment unit determines the MCS level and transmission power level in wireless communication system according to an embodiment of the present invention.

FIG. 8 is a flowchart illustrating the process in which the adjustment unit of FIG. 4 determines the MCS level and transmission power level.

Referring to FIG. 8, in Step S802, the adjustment unit checks the burst allocated to the MS through the packet scheduling. Herein, the burst can be the normal burst, first HARQ sub-burst, second HARQ sub-burst, etc.

Then, in Step S804, the adjustment unit checks the maximum MCS level and highest transmission power level for the burst. For reference, the maximum MCS level and highest transmission power level are determined in consideration of information about the second HARQ sub-burst if the second HARQ sub-burst exists, or information about the burst having the highest priority order of packet scheduling if the second HARQ sub-burst does not exist. Herein, the maximum MCS level and highest transmission power level are the maximum MCS level determined by the MCS determination unit 410 and the highest transmission power level determined by the transmission power determination unit 430.

Then, in Step S806, the adjustment unit determines the maximum MCS level and highest transmission power level as the MCS level and the transmission power level for the burst. The determination of the maximum MCS level and highest transmission power level for the normal burst, first HARQ sub-burst, and second HARQ sub-burst, and the determination of the MCS level and the transmission power level for the normal burst, first HARQ sub-burst, and second HARQ sub-burst according to the determination of the maximum MCS level and highest transmission power level will now be described below in relation to the types of the bursts.

Then, in Step S808, the adjustment unit calculates the total transmission power for the burst by using the MCS level and transmission power level for the burst, and updates the total transmission power of the MS by using the calculated total transmission power. For example, the adjustment unit updates the allowable total transmission power of the MS with the remained transmission power excluding the total transmission power for the burst from the highest transmission power of the MS.

Then, in Step S810, the adjustment unit checks whether the current burst corresponding to the determined MCS level and transmission power level is the last burst. That is, the adjustment unit checks whether a remaining burst to determine the MCS level and transmission power level exists or not, among the normal burst, first HARQ sub-burst, and second HARQ sub-burst allocated to the MS. In this case, the adjustment unit checks whether to determine the MCS level and transmission power level for the burst (e.g. the next burst) whose MCS level and transmission power level have been not yet determined, within the updated total transmission power of the MS. For reference, the MCS level for the burst is stored as the maximum MCS level, and the transmission power level for the burst is stored after normalization by Equation 2.

As a result of the check in Step S810, if the remaining burst to determine the MCS level and transmission power level exists, the adjustment unit determines the MCS level and transmission power level for the remaining burst by repeatedly performing Steps S802-S810. However, as a result of the check in Step S810, if the remaining burst to determine the MCS level and transmission power level does not exist, the adjustment unit completes the determination of the MCS level and transmission power level for the entire bursts of the MS, and transmits the determined MCS level and transmission power level for the entire bursts to the generation part 230 in order to generate the MAP information including the information about the determined MCS level and transmission power level.

Hereinafter, the process in which the adjustment unit determines the MCS level and transmission power level according to type of the burst checked in Step S802 will now be described.

Firstly, if the burst checked in Step S802 is a first scheduled HARQ retransmission burst (e.g. first scheduled second HARQ sub-burst), the adjustment unit loads 'initial maximum allowable total transmission power' which is declared by the SBC-REQ (Mobile Station's Basic Capability Negotiation Request) message from the MS, and loads 'HARQ retransmission information structure' from the HARQ module (not shown). The 'HARQ retransmission information structure' contains information about whether the HARQ retransmission exists at current frame or not and information about what is the highest MCS level among HARQ retransmission bursts. In this case, if only one HARQ retransmission burst exists, information about the MCS level of the corresponding HARQ retransmission burst will be included.

As a result of the check in Step S802, if the HARQ retransmission burst exists and the first scheduled burst is the second HARQ sub-burst, in Step S804, the adjustment unit checks the maximum MCS level for the first scheduled burst determined by the MCS determination unit and the highest transmission power level for the first scheduled burst determined by the transmission power determination unit. Herein, the maximum MCS level for the first scheduled burst is obtained from the maximum MCS level of the second HARQ sub-burst, and the highest transmission power level for the first scheduled burst is obtained from the highest transmission power level of the second HARQ sub-burst. For reference, the highest transmission power level for the first scheduled burst is a result of adding the control offset to the first transmission power level calculated by Equation 1 according to the maximum MCS level. The maximum MCS level is the highest MCS limitation for the normal burst and HARQ first transmitted burst (i.e. first HARQ sub-burst), and the maximum MCS level and highest transmission power level are not changed at a frame.

Thereafter, in Step S806, the adjustment unit determines the maximum MCS level and highest transmission power level for the first scheduled burst as the MCS level and transmission power level of the second HARQ sub-burst. Herein, the MCS level can be checked from the HARQ module.

Then, in Step S808, the adjustment unit calculates the total transmission power for the first scheduled burst by using the MCS level and the transmission power level for the first scheduled burst, and updates the total transmission power of the MS by using the calculated total transmission power. Specifically, the adjustment unit updates the available total transmission power of the MS with the remained transmission power that is calculated by subtracting the total transmission power for the first scheduled burst from the total transmission power of the MS checked by the SBC-REQ message.

In addition, the adjustment unit filters the control offset determined by the offset determination unit according to the per-determined maximum and minimum threshold offset, and updates the total transmission power of the MS if the filtered control offset is between the maximum and minimum power offset. On the contrary, if the filtered control offset is not between the maximum and minimum power offset, the adjustment unit resizes the packet size for the multi-bursts and updates the total transmission power of the MS.

Thereafter, in Step S810, the adjustment unit checks whether the current first scheduled burst is the last burst for the MS, and if not the last burst, determines the MCS level and transmission power level for the remaining burst by repeatedly performing Steps S802-S810. For reference, the transmission power level for the first scheduled burst is stored after normalization by Equation 2, and the MCS level for the first scheduled burst is stored as the maximum MCS level.

Secondly, if the burst checked in Step S802 is a non-first scheduled HARQ retransmission burst (e.g. non-first scheduled second HARQ sub-burst), in Step S804, the adjustment unit checks the maximum MCS level for the second HARQ sub-burst determined by the MCS determination unit and the highest transmission power level for the second HARQ sub-burst determined by the transmission power determination unit. Herein, the maximum MCS level and highest transmission power level are determined based on the available total transmission power of the MS.

Thereafter, in Step S806, the adjustment unit determines the maximum MCS level and highest transmission power level for the second HARQ sub-burst as the MCS level and transmission power level of the second HARQ sub-burst. Herein, the MCS level can be checked from the HARQ module.

Then, in Step S808, the adjustment unit calculates the total transmission power for the second HARQ sub-burst by using the MCS level and transmission power level for the second HARQ sub-burst, and updates the total transmission power of the MS by using the calculated total transmission power. Specifically, the adjustment unit updates the available total transmission power of the MS with the remained transmission power that is calculated by subtracting the total transmission power for the second HARQ sub-burst from the previous available total transmission power of the MS.

In addition, the adjustment unit filters the control offset determined by the offset determination unit according to the per-determined maximum and minimum threshold offset, and updates the total transmission power of the MS if the filtered control offset is between the maximum and minimum power offset. On the contrary, if the filtered control offset is not between the maximum and minimum power offset, the adjustment unit resizes the packet size for the multi-bursts and updates the total transmission power of the MS.

Thereafter, in Step S810, the adjustment unit checks whether the current second HARQ sub-burst is the last burst for the MS, and if not the last burst, determines the MCS level and transmission power level for the remaining burst by repeatedly performing Steps S802-S810. For reference, the transmission power level for the second HARQ sub-burst is stored after normalization by Equation 2, and the MCS level for the second HARQ sub-burst is stored as the maximum MCS level.

Thirdly, if the burst checked in Step S802 is a non-first scheduled non-HARQ retransmission burst (e.g. non-first scheduled normal burst and first HARQ sub-burst), in Step S804, the adjustment unit checks the maximum MCS level for the normal burst or first HARQ sub-burst determined by the MCS determination unit and the highest transmission power level for the normal burst or first HARQ sub-burst determined by the transmission power determination unit. Herein, the maximum MCS level and highest transmission power level are determined based on the available total transmission power of the MS.

Thereafter, in Step S806, the adjustment unit determines the maximum MCS level and highest transmission power level for the normal burst or first HARQ sub-burst as the MCS level and transmission power level of the normal burst or first HARQ sub-burst.

Then, in Step S808, the adjustment unit calculates the total transmission power for the normal burst or first HARQ sub-burst by using the MCS level and transmission power level for the normal burst or first HARQ sub-burst. In this case, if the calculated total transmission power for the normal burst or first HARQ sub-burst is greater than the available total transmission power, the adjustment unit redetermines the MCS level and transmission power level by decreasing the MCS level, and calculates the total transmission power for the normal burst or first HARQ sub-burst. Meanwhile, if the calculated total transmission power for the normal burst or first HARQ sub-burst is less than the available total transmission power, the adjustment unit updates the total transmission power of the MS by using the calculated total transmission power. Specifically, the adjustment unit updates the available total transmission power of the MS with the remained transmission power that is calculated by subtracting the total transmission power for the normal burst or first HARQ sub-burst from the previous total transmission power of the MS. Meanwhile, if the redetermined MCS level is the minimum MCS level for the normal burst or first HARQ sub-burst, the adjustment unit updates the total transmission power of the MS after resizing the packet size for the multi-bursts.

In addition, the adjustment unit filters the control offset determined by the offset determination unit according to the per-determined maximum and minimum threshold offset, and updates the total transmission power of the MS if the filtered control offset is between the maximum and minimum power offset. On the contrary, if the filtered control offset is not between the maximum and minimum power offset, the adjustment unit resizes the packet size for the multi-bursts and updates the total transmission power of the MS.

Thereafter, in Step S810, the adjustment unit checks whether the current normal burst or first HARQ sub-burst is the last burst for the MS, and if not the last burst, determines the MCS level and transmission power level for the remaining burst by repeatedly performing Steps S802-S810. For reference, the transmission power level for the normal burst or first HARQ sub-burst is stored after normalization by Equation 2, and the MCS level for the normal burst or first HARQ sub-burst is stored as the maximum MCS level.

Fourthly, if the burst checked in Step S802 is a first scheduled non-HARQ retransmission burst (e.g. first scheduled normal burst and first HARQ sub-burst) with HARQ retransmission burst (e.g. second HARQ sub-burst) later, the adjustment unit loads 'initial maximum allowable total transmission power' which is declared by the SBC-REQ (Mobile Station's Basic Capability Negotiation Request) message from the MS, and loads 'HARQ retransmission information structure' from the HARQ module (not shown). The 'HARQ retransmission information structure' contains information about whether the HARQ retransmission exists at current frame or not and information about what is the highest MCS level among HARQ retransmission bursts. In this case, if only one HARQ retransmission burst exists, information about the MCS level of the corresponding HARQ retransmission burst will be included.

In case that the HARQ retransmission burst (i.e. the second HARQ sub-burst) exists, in Step S804, the adjustment unit checks the maximum MCS level by substituting the maximum MCS level for the first scheduled determined by the MCS determination unit with the highest MCS level for the second HARQ sub-burst, and checks the highest transmission power level for the first scheduled burst determined by the transmission power determination unit in accordance with the highest MCS level for the second HARQ sub-burst. Herein, the maximum MCS level for the first scheduled burst is obtained from the maximum MCS level of the second HARQ sub-burst, and the highest transmission power level for the first scheduled burst is a result of adding the control offset to the first transmission power level calculated by Equation 1 according to the maximum MCS level. The maximum MCS level is the highest MCS limitation for the normal burst and HARQ first transmitted burst (i.e. the first HARQ sub-burst), and the maximum MCS level and the highest transmission power level are not changed at a frame.

Thereafter, in Step S806, the adjustment unit determines the maximum MCS level and highest transmission power level for the first scheduled burst as the MCS level and transmission power level of the first scheduled burst.

Then, in Step S808, the adjustment unit calculates the total transmission power for the first scheduled burst by using the MCS level and transmission power level for the first scheduled burst. In this case, if the calculated total transmission power for the first scheduled burst is greater than the available total transmission power, the adjustment unit redetermines the MCS level and transmission power level by decreasing the MCS level, and calculates the total transmission power for the first scheduled burst. Meanwhile, if the calculated total transmission power for the first scheduled burst is less than the available total transmission power, the adjustment unit updates the total transmission power of the MS by using the calculated total transmission power. Specifically, the adjustment unit updates the available total transmission power of the MS with the remained transmission power that is calculated by subtracting the total transmission power for the first scheduled burst from the previous total transmission power of the MS. Meanwhile, if the redetermined MCS level is the minimum MCS level for the first scheduled burst, the adjustment unit updates the total transmission power of the MS after resizing the packet size for the multi-bursts.

In addition, the adjustment unit filters the control offset determined by the offset determination unit according to the per-determined maximum and minimum threshold offset, and updates the total transmission power of the MS if the filtered control offset is between the maximum and minimum power offset. On the contrary, if the filtered control offset is not between the maximum and minimum power offset, the adjustment unit resizes the packet size for the multi-bursts and updates the total transmission power of the MS.

Thereafter, in Step S810, the adjustment unit checks whether the current first scheduled burst is the last burst for the MS, and if not the last burst, determines the MCS level and transmission power level for the remaining burst by repeatedly performing Steps S802-S810. For reference, the transmission power level for the first scheduled burst is stored after normalization by Equation 2, and the MCS level for the first scheduled burst is stored as the maximum MCS level.

Fifthly, if the burst checked in Step S802 is a first scheduled non-HARQ retransmission burst (e.g. first scheduled normal burst and first HARQ sub-burst) without HARQ retransmission burst (e.g. second HARQ sub-burst) later, the adjustment unit loads 'initial maximum allowable total transmission power' which is declared by the SBC-REQ (Mobile Station's Basic Capability Negotiation Request) message from the MS.

The 'initial maximum allowable total transmission power' becomes the maximum allowable total transmission power of the MS.

In case that the HARQ retransmission burst (i.e. the second HARQ sub-burst) does not exist, in Step S804, the adjustment unit checks the maximum MCS level for the normal burst or first HARQ sub-burst determined by the MCS determination unit and the highest transmission power level for the normal burst or first HARQ sub-burst determined by the transmission power determination unit. Herein, the maximum MCS level and highest transmission power level are determined based on the available total transmission power of the MS.

Thereafter, in Step S806, the adjustment unit determines the maximum MCS level and highest transmission power level for the normal burst or first HARQ sub-burst as the MCS level and transmission power level of the normal burst or first HARQ sub-burst.

Then, in Step S808, the adjustment unit calculates the total transmission power for the normal burst or first HARQ sub-burst by using the MCS level and transmission power level for the normal burst or first HARQ sub-burst. In this case, if the calculated total transmission power for the normal burst or first HARQ sub-burst is greater than the available total transmission power, the adjustment unit redetermines the MCS level and transmission power level by decreasing the MCS level, and calculates the total transmission power for the normal burst or first HARQ sub-burst. Meanwhile, if the calculated total transmission power for the normal burst or first HARQ sub-burst is less than the available total transmission power, the adjustment unit updates the total transmission power of the MS by using the calculated total transmission power. Specifically, the adjustment unit updates the available total transmission power of the MS with the remained transmission power that is calculated by subtracting the total transmission power for the normal burst or first HARQ sub-burst from the previous total transmission power of the MS. Meanwhile, if the redetermined MCS level is the minimum MCS level for the normal burst or first HARQ sub-burst, the adjustment unit updates the total transmission power of the MS after resizing the packet size for the multi-bursts.

In addition, the adjustment unit filters the control offset determined by the offset determination unit according to the per-determined maximum and minimum threshold offset, and updates the total transmission power of the MS if the filtered control offset is between the maximum and minimum power offset. On the contrary, if the filtered control offset is not between the maximum and minimum power offset, the adjustment unit resizes the packet size for the multi-bursts and updates the total transmission power of the MS.

Thereafter, in Step S810, the adjustment unit checks whether the current normal burst or first HARQ sub-burst is the last burst for the MS, and if not the last burst, determines the MCS level and transmission power level for the remaining burst by repeatedly performing Steps S802-S810. For reference, the transmission power level for the normal burst or first HARQ sub-burst is stored after normalization by Equation 2, and the MCS level for the normal burst or first HARQ sub-burst is stored as the maximum MCS level.

As mentioned above, the BS according to the present invention checks multi-burst allocated to the MS through the packet scheduling, and determines the maximum MCS level and highest transmission power level determined according to the priority order of the packet scheduling as the MCS level and transmission power level for the multi-burst allocated to the MS. Also, the BS according to the present invention updates the total transmission power of the MS by using the MCS level and transmission power level, and determines the MCS level and transmission power level for the multi-burst having the next highest priority order within the updated total transmission power of the MS. Herein, the determined MCS level and transmission power level are stored to be used in determination of the MCS level and transmission power level for the multi-burst allocated to the MS at next frame. In particular, the transmission power level is stored as the normalized transmission power level with the reference MCS level. Thus, the BS according to the present invention determines the transmission power level of the burst for the candidate MCS levels of the MS by using the normalized transmission power level.

While the invention has been shown and described with reference to a certain preferred embodiment thereof, it will be understood by those skilled in the art that various changes in form and details may be made therein without departing from the spirit and scope of the invention as defined by the appended claims.

The invention claimed is:

1. An apparatus for scheduling in a wireless communication system, the apparatus comprising:

a packet scheduler for allocating multi-bursts comprising a Hybrid Automatic Repeat reQuest (HARQ) burst and a normal burst to a mobile station;

an operation part for determining a Modulation and Coding Scheme (MCS) level and a transmission power level for the multi-bursts by using burst information and a parameter of the multi-bursts allocated to the mobile station; and a generation part for generating MAP information comprising the burst information, the determined MCS level, and the determined transmission power level, wherein the operation part calculates a total transmission power for a first scheduled burst having a highest priority order among the multi-bursts by using a MCS level and a transmission power level for the first scheduled burst, and updates the total transmission power of the mobile station by subtracting the calculated total transmission power from a maximum transmission power of the mobile station.

2. The apparatus of claim 1, wherein the HARQ burst is transmitted through a connection supporting HARQ, and the normal burst is transmitted through a connection not supporting HARQ.

3. The apparatus of claim 1, wherein the HARQ burst comprises a first HARQ sub-burst that is first transmitted through a connection supporting HARQ and a second HARQ sub-burst that is retransmitted through the connection supporting HARQ.

4. The apparatus of claim 1, wherein the parameter comprises at least one of maximum transmission power information, current transmission power level information, Downlink (DL) Carrier to Interference and Noise Ratio (CINR) information, path loss information, Uplink (UL) CINR information, and Noise and Interference (NI) information.

5. The apparatus of claim 1, wherein the operation part determines a maximum MCS level and a highest transmission power level for the multi-bursts by using the burst information and the parameter, and determines the MCS level and the transmission power level for the multi-bursts using the determined maximum MCS level and the determined highest transmission power level for the multi-bursts.

6. The apparatus of claim 3, wherein the operation part determines a maximum MCS level for the second HARQ sub-burst as the MCS level for the multi-bursts when the second HARQ sub-burst exists, and determines a MCS level for a burst which has a highest priority order of packet scheduling as the MCS level for the multi-bursts when the second HARQ sub-burst does not exist.

7. The apparatus of claim 1, wherein the operation part determines a maximum MCS level for a first scheduled burst having a highest priority order among the multi-bursts as a MCS level for the first scheduled burst, and determines a highest transmission power level for the first scheduled burst as a transmission power level for the first scheduled burst.

8. The apparatus of claim 1, wherein the operation part determines a highest transmission power level for a second scheduled burst having a next highest priority order, based on the updated total transmission power of the mobile station.

9. The apparatus of claim 1, wherein the operation part filters a control offset according to a predetermined maximum threshold offset and a predetermined minimum threshold offset, and updates the total transmission power of the mobile station if the filtered control offset exists between the predetermined maximum power offset and the predetermined minimum power offset.

10. The apparatus of claim 1, wherein the operation part filters a control offset according to a predetermined maximum threshold offset and a predetermined minimum threshold offset, and updates the total transmission power of the mobile station after resizing a packet size for the multi-bursts if the filtered control offset does not exist between the predetermined maximum power offset and the predetermined minimum power offset.

11. The apparatus of claim 1, wherein the operation part checks the multi-bursts, Downlink (DL) Carrier to Interference and Noise Ratio (CINR) for the multi-bursts, and Downlink Interval User Code (DIUC) for the multi-bursts, and determines a maximum MCS level based on the DL CINR or the DIUC.

12. An apparatus for scheduling in a wireless communication system, the apparatus comprising:
   a packet scheduler for allocating multi-bursts comprising a Hybrid Automatic Repeat reQuest (HARM) burst and a normal burst to a mobile station;
   an operation part for determining a Modulation and Coding Scheme (MCS) level and a transmission power level for the multi-bursts by using burst information and a parameter of the multi-bursts allocated to the mobile station; and
   a generation part for generating MAP information comprising the burst information, the determined MCS level, and the determined transmission power level,
   wherein the operation part comprises a link adaptation module which comprises:
      an MCS determination unit for determining a maximum MCS level for the multi-bursts by using the burst information and the parameter;
      an offset determination unit for determining a control offset by using the parameter;
      a transmission power determination unit for determining a highest transmission power level for the multi-bursts by using the burst information, the parameter, and the control offset; and
      an adjustment unit for determining the MCS level and transmission power level for the multi-bursts by using the burst information, the parameter, the maximum MCS level, and the highest transmission power level.

13. The apparatus of claim 12, wherein the operation part further comprises:
   a Packet Error Rate (PER) compensation module for determining a first offset for compensating a PER for the multi-bursts; and
   a repetition check module for determining a second offset for compensating an operation error of the transmission power level per sub-carrier in repetition of a specific MCS level for the multi-bursts.

* * * * *